(12) United States Patent
Burke

(10) Patent No.: US 7,806,957 B1
(45) Date of Patent: Oct. 5, 2010

(54) BALANCED FERTILIZER PRODUCTION AND IMPROVED ANAEROBIC DIGESTION EFFICIENCY

(76) Inventor: Dennis Anthony Burke, 6007 Hill St. NE., Olympia, WA (US) 98516

( * ) Notice: Subject to any disclaimer, the term of this patent is extended or adjusted under 35 U.S.C. 154(b) by 448 days.

(21) Appl. No.: 11/771,512

(22) Filed: Jun. 29, 2007

Related U.S. Application Data

(60) Provisional application No. 60/928,697, filed on May 11, 2007.

(51) Int. Cl.
*C05F 11/08* (2006.01)
(52) U.S. Cl. ................................ 71/10; 71/11
(58) Field of Classification Search .............. 71/10, 71/11
See application file for complete search history.

(56) References Cited

U.S. PATENT DOCUMENTS

| | | | | |
|---|---|---|---|---|
| 3,014,896 A | * | 12/1961 | Colwell et al. | 526/307 |
| 4,213,857 A | * | 7/1980 | Ishida et al. | 210/603 |
| 4,510,243 A | * | 4/1985 | Haga et al. | 435/167 |
| 6,447,681 B1 | * | 9/2002 | Carlberg et al. | 210/602 |
| 2005/0113611 A1 | * | 5/2005 | Adams et al. | 585/240 |
| 2005/0252855 A1 | * | 11/2005 | Shieh et al. | 210/605 |

OTHER PUBLICATIONS

Hiroyuki Yoshida, Production of Organic Acids and Amino Acids from Fish Meat by Sub-Critical Water Hydrolysis, 1999, Biotechnology, 15, 1090-1094.*

* cited by examiner

*Primary Examiner*—Timothy C Vanoy
*Assistant Examiner*—Michelle Hou
(74) *Attorney, Agent, or Firm*—Brian J. Coyne

(57) ABSTRACT

A method is provided for producing a balanced fertilizer from an anaerobic digestion process. The process includes anaerobically digesting a diluted influent mixed slurry in a digestion area and producing an effluent. The process includes separating water from the effluent to produce a liquid effluent, which is used as recycle water and a dewatered solids effluent. The process includes separating toxic compounds from the recycle water via a toxics strip and recovery area. The process includes mixing the detoxified recycle water with an influent solids slurry in a mixing area to provide the diluted influent mixed slurry. The process includes combining the toxic compounds with the dewatered solids effluent to produce a balanced fertilizer.

47 Claims, 3 Drawing Sheets

US 7,806,957 B1

BALANCED FERTILIZER PRODUCTION AND IMPROVED ANAEROBIC DIGESTION EFFICIENCY

CROSS-REFERENCE TO RELATED APPLICATION

This application claims the benefit of U.S. Provisional Application No. 60/928,697, filed May 11, 2007, incorporated herein by reference.

BACKGROUND

Typically, the effluent slurry (after digestion) from an anaerobic digester is separated into two portions, including a solids portion containing most of the phosphorus and a liquid portion containing most of the nitrogen and potassium. The liquid portion is normally stored in a holding pond for land application or returned by pipeline to an aerobic treatment facility. The solid portion is normally removed, collected, and used for animal bedding or disposed in a landfill, sold for horticulture use, or used in a land application.

The consequences of the typical anaerobic process is that neither separated solid nor liquid effluent portions, once separated, can be used as a "balanced" fertilizer since a majority of the nitrogen and potassium resides with the liquid and a majority of the phosphorus resides with the solids. A balanced fertilizer is one that contains nutrients that a plant needs to grow, such as potassium, sulfur, phosphorus, and nitrogen, in a ratio similar to the influent slurry.

A conventional arrangement for anaerobic digestion of concentrated waste substrates, such as sludge, food waste, or animal manure, is illustrated in FIG. 1. The concentrated waste slurry 102 is normally diluted with water 106 if the influent solids concentration is greater than the desirable maximum digester solids concentration, which is normally less than 12%. The slurry 102 and water 106 are mixed in the mixing area 104 to produce mixed slurry, which is then digested in any of a variety of anaerobic digesters 108. The effluent slurry 110 from the digester 108 is then separated by a separation device 112 into a solid portion 114 and a liquid portion 116 for disposal.

As FIG. 1 shows, high solids anaerobic systems produce two effluent streams including a solid and liquid stream, neither of which contains nutrients in the ratio similar to the influent stream. Other prior art systems are variations of FIG. 1. For example, single solid effluent systems and single liquid effluent systems are possible if separation 112 is not carried out.

A single solid effluent stream may be created by minimizing or limiting the amount of anaerobic digestion that occurs so that the effluent solids concentration is substantially the same as the influent solids concentration. However, this option is inefficient because there is relatively little conversion of the solids. If, on the other hand, a reasonable digestion detention time is allowed, anaerobic digestion can convert more than 20% of the solids to gas, resulting in a liquid effluent stream. However, liquid streams are generally not desirable because of the difficulty of handling and the disposal of liquid streams.

Because the cost of transporting liquid effluent greatly exceeds the cost of transporting a solid dewatered product, sometimes a solid slurry stream, even with low conversion of solids in the digester, will be produced. Conditions that may require a solid slurry stream include (1) land may not be available or in close proximity for the disposal of the separated liquid portion, (2) the cost of hauling the liquid portion to some disposal site is excessive, (3) the discharge of the liquid portion containing high nutrient concentrations is limited by the wastewater treatment facility's ability to treat the liquid or the receiving ground or surface waters cannot receive the effluent nutrient load, and (4) there is a need to produce a highly valued balanced fertilizer containing the nitrogen, phosphorus, potassium, and sulfur for crop growth and pollution abatement.

However, the prior art systems have failed to provide a dewatered solids product with high solids conversion in the anaerobic digester and wherein the solids product can be used as a balanced fertilizer. If a balanced fertilizer is not available for agricultural crops, the nutrients from an unbalanced fertilizer when applied in excess of the limiting nutrient will eventually pollute the environment through runoff, volatilization, or erosion. Consequently, a balanced fertilizer would be advantageous.

SUMMARY

The limitations of the prior art that produce only a single effluent solid, a single effluent liquid, or solid and liquid effluents can be overcome by utilizing the embodiments of a process described herein that produce a liquid effluent and a solid effluent, wherein the liquid effluent is recycled to the anaerobic digester and the dewatered solids effluent can be used as a balanced fertilizer. A process includes the step of diluting or hydrating an influent slurry with recycle water from a separator. The influent slurry contains a dry solids concentration ($X_{Inf}$). The process may include the step of macerating the slurry to produce a slurry of desired consistency. The process includes the step of anaerobically digesting the diluted slurry in any of a variety of anaerobic digesters to produce an effluent. The digestion process may not fully digest all solids. The process includes the step of separating water from the effluent to produce a dewatered solids effluent and a liquid effluent. The process includes the step of using the liquid effluent as recycle water to dilute or hydrate the influent slurry. The process includes the step of dewatering or separating the solids that were not digested from the digester effluent utilizing a device that will produce an effluent having a dry solids concentration ($X_{Eff}$) equal to the influent dry solids concentration ($X_{Inf}$) multiplied by one minus the fraction of the solids that are converted to gas ($X_G$), according to equation (1).

$$X_{Eff} = X_{Inf} * (1 - X_G) \tag{1}$$

$X_{Eff}$=Mass Dry Solids Effluent/Total Mass Out
$X_{Inf}$=Mass Dry Solids Influent/Total Mass In
$X_G$=Mass Dry Solids Influent Converted to Gas/Mass Dry Solids Influent The process also includes the step of removing toxic compounds, such as ammonia and/or organic acids, from the liquid effluent to produce detoxified liquid effluent, and recycling the detoxified liquid effluent for mixing with the influent slurry, while the removed toxic compounds or converted compounds therefrom are incorporated into the dewatered solids effluent. Hydrogen sulfide and/or carbon dioxide may be removed from gas produced by anaerobic digestion, converted by a conversion process, and the gases or converted compounds therefrom similarly added to the dewatered solids effluents. The result is a dewatered solids effluent having the nutrients in a similar ratio to the influent slurry.

Other optional steps can be included into the process as desired. In one embodiment, the process may include the step of heating the liquid effluent used as recycle water in the recycle loop to assist in the removal of toxic compounds by raising the temperature for stripping as well as to provide the desired heat for the anaerobic digestion process. If necessary, the process may include the step of adding some makeup water to the recycle water to compensate for evaporation losses through the gas stream produced during anaerobic digestion or for losses attributed to liquid fertilizer production. The makeup water may also be added with a polymer, coagulants, and flocculants in a separation area to assist with the separation of the dewatered solids effluent and the liquid effluent. Liquid fertilizer may be removed at any point in the process to produce economical amounts of liquid fertilizer. Ammonia, as well as hydrogen sulfide (defined as toxic compounds herein), may be stripped in a manner similar to U.S. Pat. No. 6,866,779 and such stripped toxic compounds may be incorporated in the dewatered solids effluent in their toxic compound form or, alternatively, by converting and recovering the toxic compounds into harmless nitrogen and sulfur-containing compounds through any physical, chemical, or biological conversion process.

The removal of ammonia and other toxic byproducts produced during anaerobic digestion increases the efficiency of the digester, since neither ammonia nor hydrogen sulfide can accumulate to very high levels. The ammonia and hydrogen sulfide, along with other compounds, are advantageously removed and the nutrients, including nitrogen and sulfur, are added to the dewatered solids effluent. Accordingly, the process provides for the production of a balanced fertilizer from an anaerobic digester while improving the efficiency of the digester during the conversion of a slurry having a high solids concentration in the range from about 8% to about 80% solids to gas by the controlled separation and dilution of water recycle.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
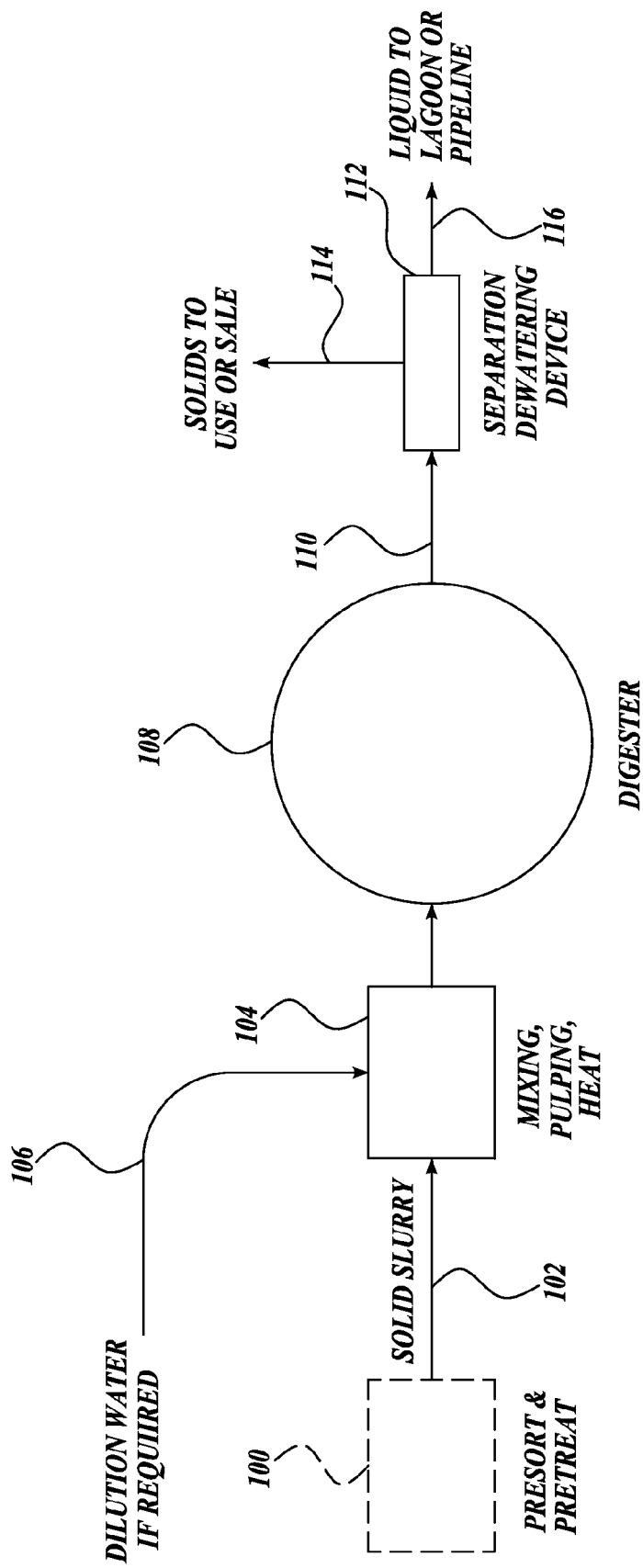
FIG. 1 is a diagrammatical illustration of a related art process of anaerobic digestion.
Figure 2:
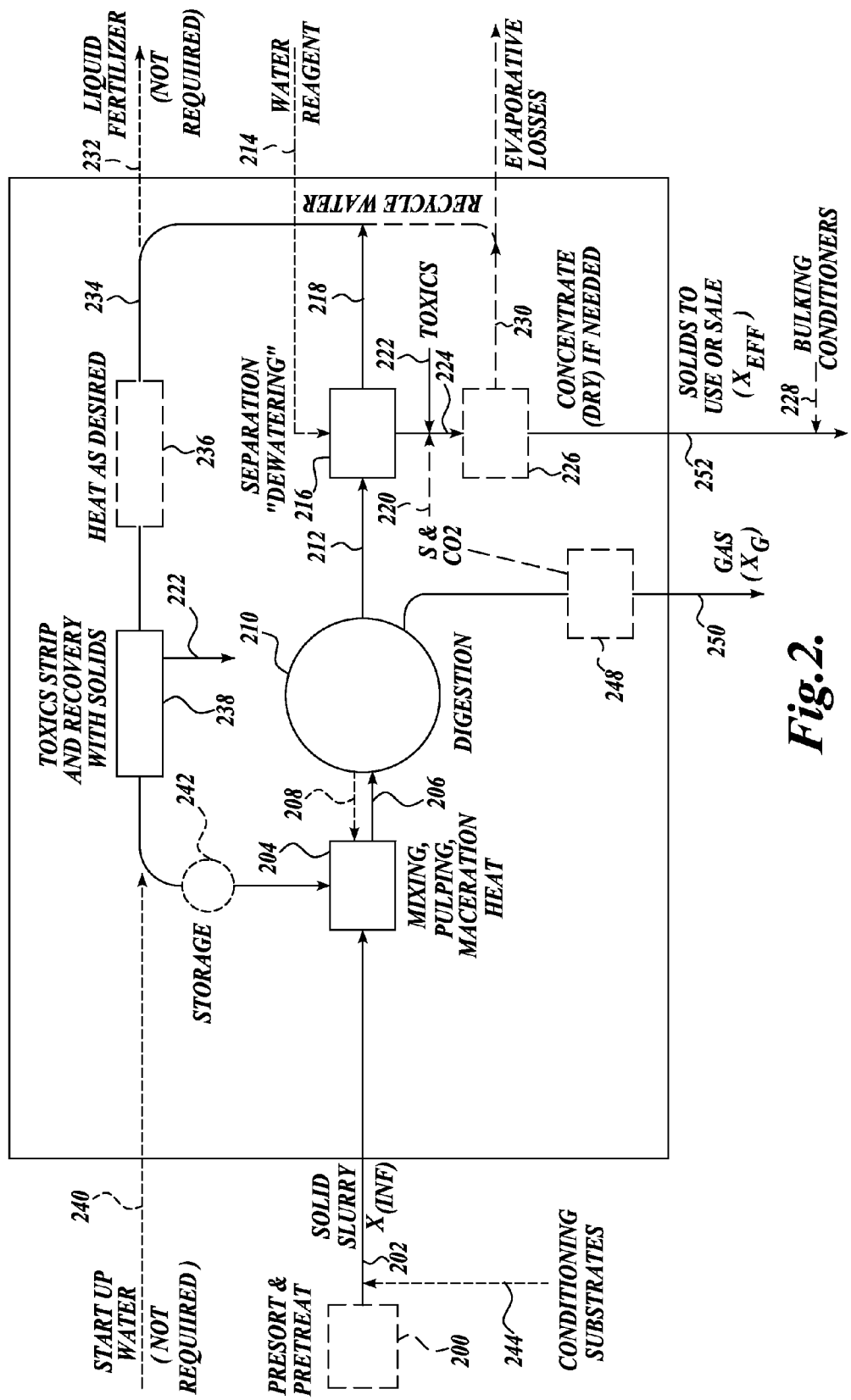
FIG. 2 is a diagrammatical illustration of an anaerobic process in accordance with one embodiment of the present invention.

Referring to FIG. 2, a process for anaerobically digesting solids according to one embodiment of the present invention is illustrated. Dashed lines indicate optional steps that may be included as alternative embodiments to the system.

A variety of substrates containing solids can be used in the anaerobic digestion process. Raw substrates include, but are not limited to, sewage sludge (primary and waste activated), night soil, organic industrial waste, food processing waste, food waste, spoiled or recalled food, the organic fraction of municipal solid waste, hotel, restaurant, market, and domestic food waste, rendering waste, fats, oils and grease, grease trap wastes, animal manure, poultry manure (with or without bedding materials), feed lot waste, crop residues, food and dairy processing wastes, and solids concentration modifying wastes, including cellulose materials such as paper, paper products, sawdust, and wood chips.

In one embodiment, the process includes a step whereby a solid slurry 202 containing one or more substrates containing solids may first undergo a pre-sort and pre-treatment operation in a pre-treatment area 200. As used herein, the "solid slurry 202" may include liquids, such as water. The influent solids concentration ($X_{Inf}$) of Equation (1) is measured in the slurry 202 before the slurry 202 enters the mixing area 204 and may reflect the addition of conditioning substrates 244 to adjust the nutrient concentration or the solids concentration ($X_{Eff}$) of the dewatered solids effluent.

The pretreatment area 200 may include any one or more aerobic, physical, chemical, or biological treatment of the substrate to produce a sludge to be anaerobically treated. Alternatively or additionally, the substrate may be sorted to remove non-biodegradable solids such as glass, metal, plastics, stones, etc., from municipal solid waste to produce primarily an organic biodegradable substrate.

Additionally, the process may include a step for adding conditioning substrates 244 to the solid slurry 202. The conditioning substrates 244 may be used to tailor the solids concentration and nutrient concentration of the dewatered solids effluent or to increase gas production by adding carbonaceous substrates 244 deficient in nutrients such as paper or sawdust prior to or subsequent to a mixing area 204. The conditioning substrates 244 may include those rich in nutrients, such as nitrogen, phosphorus, potassium, or sulfur, to adjust the nutrient amounts in the dewatered solids effluent or, alternatively, deficient in one or more nutrients such that the desired amounts of nutrients in the dewatered solids effluent will be produced.

The process includes the step for combining the slurry 202 with recycle water 234 in a mixing area 204 to produce a mixed slurry 206. The process may include steps for pulping, macerating, and/or heating the slurry 202 in the mixing area 204. Any one or all of the steps of mixing, pulping, macerating, and/or heating may be performed on the solid slurry 202 within the mixing area 204. The process includes the step for mixing the slurry 202 with detoxified, and optionally heated, recycle water 234 in the mixing area 204 in order to produce a homogenous mixed slurry 206 of solids and water of the desired concentration suitable for anaerobic digestion. The mixed slurry may include, for example, a concentration of solids from about 1% to about 20%, depending on the type of digester used. If the solids in the slurry 202 are not finely ground to a relatively uniform size, the process may include the steps of grinding, hydro-pulping, or macerating to produce a finely ground homogenous mixture of the desired influent solids concentration. It is to be appreciated that the mixing area 204 may include one or more vessels and associated equipment for performing the steps above. From the mixing area 204, the process includes the step of feeding the slurry 202 as a mixed slurry 206 to an anaerobic digestion area 210. In addition to the detoxified recycle water 234, the process may include the step of adding digester substrate 208 containing anaerobic bacteria from the anaerobic digestion area 210 to the slurry 202 to enhance the blending process.

The process may include the step of discharging the mixed slurry 206 from the mixing area 204 by a pump (not shown) or by gravity to the anaerobic digestion area 210. The anaerobic digestion area 210 includes, at least, one anaerobic digester of any type or combination. It can be appreciated that the digestion area 210 may comprise one or more series of vessels and equipment arranged to perform anaerobic digestion. Anaerobic digesters for use in the process can be of a variety of sizes and shapes including, but not limited, to plug flow, completely mixed, or a combination thereof, thermophilic, mesophilic, psychrophilic, temperature phased, or a combination thereof, acid-phased, or pre-acidified, continuous flow, batch flow, or sequencing batch reactor, and any of a variety of retained biomass systems including a decant, anaerobic contact digester described in U.S. Pat. No. 5,015,384 or an anaerobic contact stabilization digester described in U.S. Pat. No. 5,670,047. A suitable anaerobic digester for use in one embodiment of the present invention may operate under optimal conditions at a solids concentration that allows adequate mixing, that limits ammonia, hydrogen sulfide, and acid (toxic compounds) production and that provides adequate contact between the substrate and anaerobic organisms. The effluent slurry 212 produced from the digestion area 210 after conversion of a portion of the solids to gas will typically have a solids concentration in the range of 4% to 0.10% for a plug flow reactor or 2% to 6% for a completely mixed reactor. Depending on the type of digester, the percentage of the biodegradable solids that are in the diluted influent slurry 206 that are converted to gas can be from about 4.0% to about 8.0%.

The process may include the step of heating the contents of the anaerobic digester of the digestion area 210 to the desired temperature either in the digester or in a digester heat exchange system (not shown). Alternatively, the process may include the steps of, either one or both, heating the influent slurry 202 or heating the mixed slurry 206. Additionally or alternatively, the process may include the step of heating the recycle water 234 in a heating area 236 prior to or within the toxic strip and recovery area 238 to produce hot recycle water 234 that will assist in stripping the toxic compounds and at the same time heat the influent slurry 202 sufficiently to meet the digester temperature requirements. Heating the recycle water 234 in any one or more areas, such as in the heating area 234, the toxic strip and recovery area 238 or the storage area 242 may be advantageous, since heating water is generally less expensive than heating a thick slurry.

The digester retention time and operation are preferably sufficient to provide the desired solids reduction and gas production. Solids are converted into gas 250 in the digestion area 210 and may be released. Alternatively, the process may include the step of treating the gas 250 produced by the anaerobic digestion area 210 in a gas removal area 248. A gas scrubber may be used to remove some or all of the gases 250, such as carbon dioxide and hydrogen sulfide. The products 220 from the gas removal area 248 are then fed to the dewatered solids effluent 252. The gas concentration ($X_G$) of Equation (1) below is the mass of dry solids in the influent converted to gas divided by the mass of dry solids in the influent. Because water can evaporate and leave with the gas 250, if necessary, some makeup water may be added to compensate for evaporation losses to the gas 250 or liquid fertilizer 232. Makeup water will typically be added with polymer or coagulants and flocculants 214 to the separation area 216.

The process includes the step of transporting the effluent 212 from the anaerobic digestion area 210 to a separation "dewatering" area 216. The process includes the step of producing a dewatered solids effluent 252 and a liquid effluent 218, which is the recycle water 234, in the separation area 216. It is to be appreciated that the dewatered solids effluent 252 will still contain liquids such as water if it does not undergo a drying process. Accordingly, "dewatered" as used in connection with "dewatered solids effluent 252" means that some but not necessarily all water has been removed. In accordance with one embodiment of the invention, the solids concentration ($X_{Eff}$) of the dewatered solids effluent 252 is dictated and controlled by Equation (1) below:

$$X_{Eff} = X_{Inf} * (1 - X_G) \quad (1)$$

wherein,
$X_{Eff}$=Mass Dry Solids Effluent/Total Mass Out;
$X_{Inf}$=Mass Dry Solids Influent/Total Mass In;
$X_G$=Mass Dry Solids Influent Converted to Gas/Mass Dry Solids Influent.

The equation states that the solids concentration ($X_{Eff}$) is the mass of the dry solids of the dewatered solids effluent 252 divided by the total mass of the stream 252. However, as shown in FIG. 2, when optional steps for adding startup water 240, adding reagent 214, or removing liquid fertilizer 232 are performed, the equation is modified to take into account the mass added or removed in streams 240, 232, and 214. The mass of bulking conditioners 228 is not included in the Total Mass Out for purposes of calculating ($X_{Eff}$). Total Mass Out can include the total mass, including water and solids, of streams 252, 232, and 250. Total Mass In can include the total mass, including water and solids, of streams 202, 240, and 214. Equation (1) states that the Total Mass In is the mass of stream 202 plus any mass added to the system in streams 240 and 214 and the Total Mass Out is the mass of stream 252 and any mass removed from the system in streams 232 and 250. FIG. 2 shows the system within a box for illustrating Equation (1).

The solids effluent concentration $X_{Eff}$ of Equation (1) is measured in the dewatered solids effluent 252 after the separation area 216 and concentration area 226 (if used), but before adding bulking conditioners 228. Depending on the selected dewatering apparatus in the separation area 216, adjustment of the speed, reagent addition, belt tension, detention time, and/or other operating variables will provide the desired dewatered effluent solids concentration ($X_{Eff}$). The process may include the step of further optionally drying and/or concentrating the dewatered solids effluent 252 in a concentration area 226 and/or by adding bulking conditioners 228 to the dewatered solids effluent 252 after the separation area 216.

Figure 3:
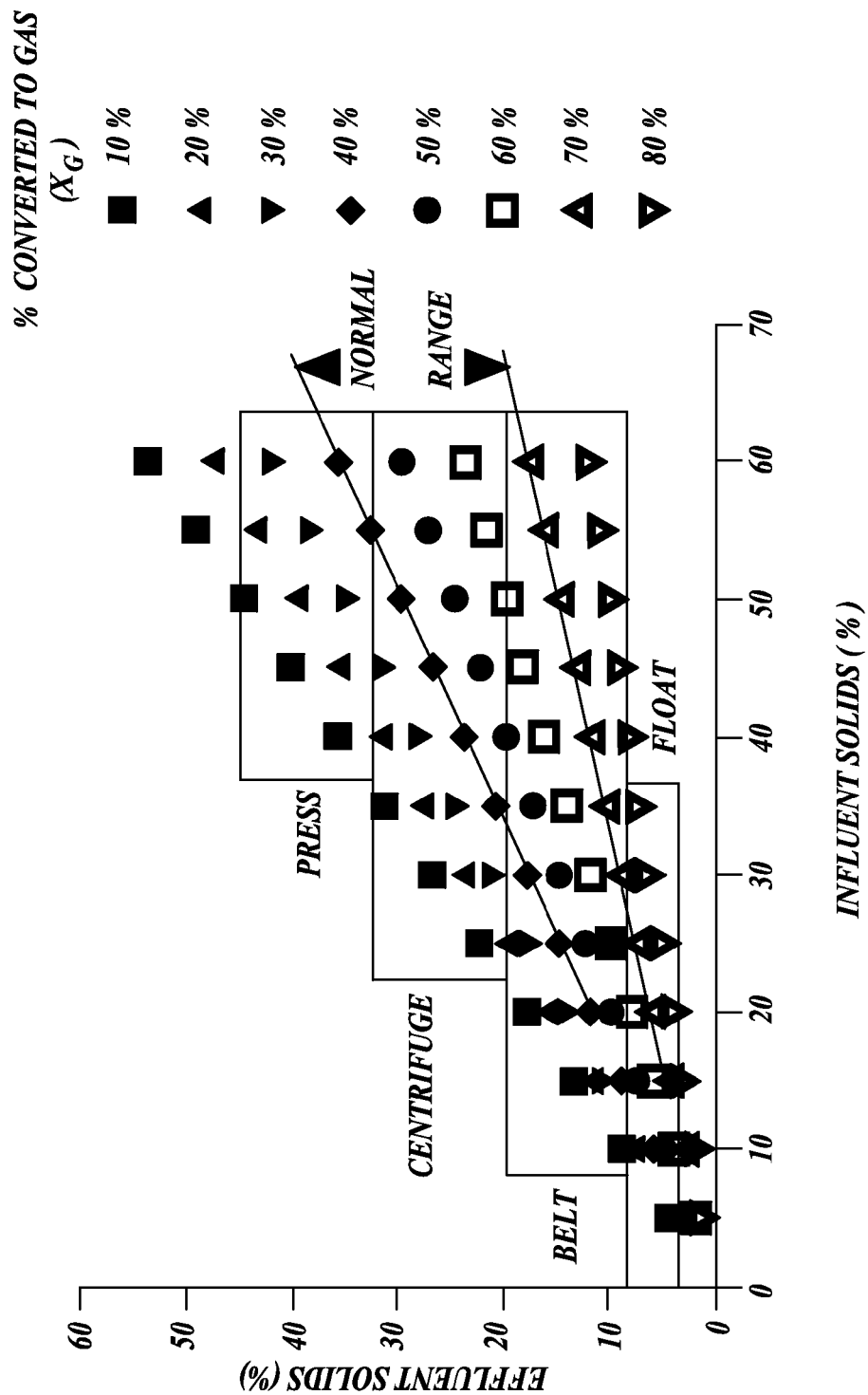
FIG. 3 is a graph illustrating the relationship between the influent solids percent and the effluent solids percent with the apparatus type superimposed on ranges of removal efficiency.

Any of a number of well known dewatering devices or a combination thereof can be used to produce the desired effluent solids concentration ($X_{Eff}$). FIG. 3 illustrates the solids effluent concentration versus the solids influent concentration with the types of equipment capable of achieving the solids effluent concentration overlapping the data according to a percent removal efficiency. For example, a screw press is at the higher range of dewatering efficiency. The screw press may be used to produce a high solids concentration cake without the use of reagents in conjunction with a flotation separator with reagents to remove colloidal solids having a low solids concentration. Such a separator combination reduces total reagent requirements while producing the desired blended solids content. The use of reagent, however, will require the addition of water to the system. Accordingly, as described above, the calculation of the effluent solids concentration ($X_{Eff}$) using Equation 1 will have to be adjusted to accommodate the addition of reagent and water 214.

The process may include the step of adding a reagent and water to the separation area 216. The reagents 214 include, but are not limited to, anionic polymers, cationic polymers, nonionic polymers, flocculants, and coagulants such as ferric chloride, ferric sulfate, ammonium sulfate, etc. The reagent 214 coagulates and flocculates the fine solids to assist in achieving the desired effluent solids concentration ($X_{Eff}$). The addition of coagulants as a reagent 214 will add water to the system. This water can be removed from the system with the dewatered solids effluent 252.

The dewatered solids effluent 252 may optionally be treated to enhance and/or adjust the nutrient content. For example, the gas 250 produced in the anaerobic digestion area 210 may include hydrogen sulfide and carbon dioxide. Depending on the gas use, it may be desirable to remove either the carbon dioxide or the hydrogen sulfide or both. The gas removal area 248 can employ a variety of known removal processes to treat the gas 250 and remove the carbon dioxide or hydrogen sulfide, or both. Such removed compounds may be incorporated in the dewatered solids effluent in their gas form or alternatively, by converting them into carbon and sulfur containing compounds through any one or more physical, chemical, or biological conversion process. The products 220 from the gas removal area 248 may be converted into carbonates, elemental sulfur, sulfur containing biomass, or iron sulfur compounds that can be added to the dewatered solids effluent 252 to produce the balanced fertilizer.

The process may include the step of concentrating the dewatered solids effluent 252 after the separation area 216. The dewatered solids effluent 252 with or without the added toxic compounds 222 and with or without the carbon dioxide and sulfur products 220 may undergo additional drying or concentration in the concentration area 226. Drying can include composting, air-drying, freeze drying, or a variety of mechanical heat-induced drying and/or pellet producing processes. Any liquid 230 that is extracted in the concentration area 226 may be recycled to heating and/or toxics strip areas 236 and 238, respectively. Some or all of the liquid 230 recovered from the concentration area 226 may be added to the recycle water 234.

The process may also include the step of adding bulking conditioners 228 to the dewatered solids effluent 252, as needed for particular applications. Bulking conditioners 228 may include cellulose containing materials, such as sawdust, shredded paper, or wood.

The process includes the step of returning the liquid effluent 218 as recycle water 234 from the separation area 216 to be combined with the solid slurry 202 in the mixing area 204. The liquid effluent 218 (recycle water 234) from the separation area 216 can be recycled by pump (not shown) or gravity to a toxics strip and recovery area 238. The process includes the step of stripping or otherwise removing toxic compounds 222, including ammonia and volatile organic acids generated during the anaerobic digestion process, and recovering the toxic compounds and/or converting them into nitrogen-containing compounds in the toxics stripping and recovery area 238, as described in U.S. Pat. Nos. 6,866,779 and 7,153,427, or through an aerobic nitrification/denitrification process. Alternatively, ammonia can be introduced to the dewatered solids effluent 252. Additionally or alternatively, hydrogen sulfide, which is also a toxic, can be recovered in the toxics strip and recovery area 238 when the pH of the water 234 is lowered, for example, by introducing carbon dioxide. Hydrogen sulfide can also be added to the dewatered solids effluent 252, either from area 238 or from area 248, as described before. It can be appreciated that the toxics stripping area 238 can include one or a series of vessels and equipment. Toxic compounds 222 collected in the toxic strip and recovery area 238 are added to the dewatered solids effluent 252 as toxic compounds 222 or as converted compounds, including nitrogen and/or sulfur-containing compounds 222. The toxic compounds and converted compounds 222 include, but are not limited to, ammonia gas, ammonium bicarbonate and/or ammonium carbonate, or ammonia containing biomass. Toxic compounds and converted compounds 222 may also be added to the digestion area 210's effluent 212. If ammonia gas is removed, the addition of carbon dioxide from the gas removal area 248 may result in the sequestration of ammonia as ammonium bicarbonate and/or ammonium carbonate, as described in U.S. Pat. No. 7,153,427. Toxic compounds 222 may include ammonia, organic acids, hydrogen gas, hydrogen sulfide gas, and/or other toxic compounds. Toxic compound removal and recovery may be performed by a variety of physical, chemical, or biological processes including, but no limited to, gas or steam stripping followed by adsorption in biofilters or other known physical chemical processes for the formation of nitrogen-containing compounds, such as ammonium sulfate, ammonium bicarbonate and/or ammonium carbonate, anhydrous ammonia, etc. Biological processes include the culturing of algae and/or other organisms that will recover ammonia in the area 238 and carbon dioxide from area 248 as biomass that can be reclaimed and added to the dewatered solids effluent 252 or, alternatively, to the digestion area's 210 effluent 212. It is understood that the efficiency of the toxics strip and recovery area 238 will dictate the concentration of toxic compounds within the system. The removal efficiency of toxics is not required to be 100%, since the anaerobic digestion process can tolerate variable concentrations of toxic compounds. Preferably, substantially all of the toxic compounds produced could be removed. The process includes the step of transferring the detoxified recycle water 234, after the toxics strip and recovery area 238 by gravity or pump to the mixing area 204, where it is used for hydrating and diluting the influent solid slurry 202 to produce the desired mixed slurry 206 to introduce into the digestion area 210.

The process may include performing a number of other steps on the recycle water 234 including, but not limited to, removing liquid fertilizer 232, adjusting the temperature of the recycle water 234 in a heater 236, introducing startup water 240, and storage 242 of the detoxified recycle water 240. These steps will be described below.

The removal of liquid fertilizer 232 can be at any point in the system. It is understood that this option may result in an unbalanced fertilizer, depending on the point of withdrawal. Accordingly, the removal of liquid fertilizer 232 should not be so great as to cause the dewatered solids effluent 252 from not having nutrients in substantially the same ratio as the influent slurry 202. In addition, the removal of small but variable quantities of liquid fertilizer 232 can be used to control the nutrient composition of the final solid fertilizer produced from the dewatered solids effluent 252.

Startup water 240 may be added to the recycle water 234 prior to the mixing area 204. Startup water 240 may be necessary, for example, when introducing the slurry 202 to the digestion area 210 for the very first time and until enough water is being recycled that the startup water 240 becomes unnecessary.

A storage area 242 may be used to store detoxified recycle water 234. The detoxified water 234 may be stored in a storage tank prior to use. The storage tank level can be monitored to determine if the recycle water 234 is increasing or decreasing over time. Dewatering in area 216 may be increased when the recycle water 234 is decreasing. The storage tank 242 may be replaced by a reservoir for liquid level monitoring in the toxics strip and recovery area 238. The separation area 216 apparatus opening parameters (belt tension, speed, holding time, reagent addition) can be adjusted by either the rate of liquid flow of the effluent 212 from the digestion area 210 or the accumulation or depletion of stored water in a storage tank of storage area 242. Although it has been described that the preferable location to add heat is before the toxics strip and recovery area 238, the process may include the step of heating the recycle water 234 in the storage tank 242 to achieve the desired temperature of the influent mixed slurry 206.

In accordance with one embodiment of the present invention, a method is therefore provided for producing a dewatered solids effluent 252 for use as a balanced fertilizer having amounts of nutrients, such as nitrogen, sulfur, potassium, and phosphorus in a proportion that substantially matches the influent solids from an anaerobic digestion process. The process includes at least the steps of anaerobically digesting a diluted influent mixed slurry 206 in a digestion area 210 and producing an effluent 212. The process includes separating water 218 from the effluent 212 to produce a liquid effluent 218, which is used as recycle water 234, and a dewatered solids effluent 252. The process includes separating toxic compounds 222 from the recycle water 234 via a toxics strip and recovery area 238. The process includes mixing the detoxified recycle water 234 with an influent solids slurry 202 in a mixing area 204 to provide the diluted influent mixed slurry 206. Hydrogen sulfide may be removed in the toxics strip and recovery area 248 or in a gas removal area 248. Therefore, the process may include removing gas products 220, such as hydrogen sulfide and carbon dioxide, from the gas removal area 248. The process includes combining toxic compounds 222 from the toxics strip and recovery area 238 and/or combining toxic compounds or converted compounds therefrom 220 (i.e., gas products 220) from the gas removal area 248 with the dewatered solids effluent 252 to produce a balanced fertilizer.

A preferred mode of operation of the separator to separate water is dictated by Equation (1).

$$X_{Eff}=X_{Inf}*(1-X_G) \qquad (1)$$

wherein, $X_{Eff}$=Mass Dry Solids Effluent/Total Mass Out $X_{Inf}$=Mass Dry Solids Influent/Total Mass In $X_G$=Mass Dry Solids Influent Converted to Gas/Mass Dry Solids Influent Equation (1) states the effluent solids concentration ($X_{Eff}$) is equal to the influent solids concentration ($X_{Inf}$) multiplied by one minus the fraction of the solids that are converted to gas ($X_G$). Equation (1) states that the influent water mass of 202 will equal the effluent water mass contained in the dewatered effluent solids 252 if no other water streams are added to or removed from the system (as defined by the box of FIG. 2). The desired effluent solids concentration ($X_{Eff}$) can be achieved by a combination of equipment selection, operation of that equipment and modification of the influent solids concentration ($X_{Inf}$) using conditioning substrates 244. With reference to FIG. 3, the following dewatering equipment can achieve the effluent solids concentration range indicated: Flotation, 4% to 10%; gravity belt, 5% to 12%; belt filter press, 10% to 24%; centrifuge, 8% to 30%; screw press, 15% to 35%; and filter press, 20% to 50%.

Flocculation chemicals as well as varying the speed of belt equipment or pressure can be used to adjust the water content of the effluent solids concentration ($X_{Eff}$) within the range of the type of equipment selected. Additionally or alternatively, the influent solids concentration ($X_{Inf}$) can be adjusted through the addition of conditioning substrates 244, for example paper, sawdust, or wood chips for achieving the desired effluent solids concentration ($X_{Eff}$) or to control nutrient concentrations in the effluent fertilizer while increasing the gas yield.

FIG. 3 is a graphical representation of the influent and effluent solids concentration as a function of the anaerobic digester solids conversion to gas and the range of expected dewatering device performance superimposed on the data points. The normal range of anaerobic digestion conversion of biodegradable solids to gas is 40% to 80%. The influent solids concentration will normally be between 8% to 80% dry solids. Adding bulking conditioners 228, such as sawdust, paper, or cardboard to the effluent solids slurry 252 can modify the effluent solids concentration ($X_{Eff}$) and also control the nutrient concentration.

The range of influent and effluent solids and nutrient concentrations are dependent upon the particular application and are preferably defined prior to implementing the process. The substrates desired to be processed should be evaluated for conversion potential and the detention time, temperature, and other variables of the digester to define the range of solids conversion to gas. Defining the values of the solids influent concentration, digester performance, and desired effluent solids concentration will assist in the selection of the appropriate dewatering device for the separation area 216, with or without modification to the influent solids concentration.

While illustrative embodiments have been illustrated and described, it will be appreciated that various changes can be made therein without departing from the spirit and scope of the invention.

The embodiments of the invention in which an exclusive property or privilege is claimed are defined as follows:

1. A method for producing a balanced fertilizer from an anaerobic digestion process, comprising:
   (a) anaerobically digesting a diluted influent slurry and producing a digester effluent;
   (b) separating water from the digester effluent to produce a dewatered solids effluent and liquid effluent;
   (c) removing toxic compounds from the liquid effluent to produce separated toxic compounds and detoxified liquid effluent;
   (d) mixing the detoxified liquid effluent with an influent slurry to provide the diluted influent slurry; and
   (e) combining the separated toxic compounds or converted compounds therefrom with the dewatered solids effluent to produce a balanced fertilizer.

2. The method of claim 1, wherein the converted compounds that are referenced in part (e) of claim 1 are produced from the separated toxic compounds by any one or more physical, chemical, or biological process.

3. The method of claim 1, further comprising heating the recycle water before separating toxic compounds.

4. The method of claim 1, further comprising removing gases produced from the step of anaerobically digesting and combining the removed gases or converted compounds therefrom with a the dewatered solids effluent.

5. The method of claim 1, further comprising adding startup water to the influent slurry before anaerobic digestion.

6. The method of claim 1, further comprising pretreating the influent slurry.

7. The method of claim 1, wherein the effluent solids concentration ($X_{eff}$) in the dewatered solids effluent is determined by the equation:

$$X_{Eff}=X_{Inf}*(1-X_G)$$

$X_{Eff}$=Mass Dry Solids Effluent/Total Mass Out $X_{Inf}$=Mass Dry Solids Influent/Total Mass Out $X_G$=Mass Dry Solids Influent Converted to Gas/Mass Dry Solids Influent.

8. The method of claim 1, wherein the influent slurry is combined with conditioning substrates to adjust then nutrient profile of the dewatered solids effluent.

9. The method of claim 1, wherein the influent slurry is combined with a material containing cellulose.

10. The method of claim 1, wherein the influent slurry is pretreated to produce a sludge.

11. The method of claim 1, wherein the influent slurry is macerated into a substantially homogeneous mixed slurry.

12. The method of claim 1, wherein the influent slurry is mixed with anaerobic bacteria.

13. The method of claim 1, further comprising concentrating the dewatered solids effluent.

14. The method of claim 1, further comprising adding bulking conditioners to the dewatered solids effluent.

15. The method of claim 1, further comprising storing the liquid effluent before combining with the influent slurry.

16. The method of claim 1, wherein the influent solids concentration is about 8% to about 80%.

17. The method of claim 1, further comprising adding conditioning substrates to the influent slurry to control the dewatered solids effluent solids concentration.

18. The method of claim 1, further comprising sorting the influent slurry to remove non-biodegradable solids.

19. The method of claim 1, further comprising adding conditioning substrates to the influent slurry to increase gas production, wherein the conditioning substrates include carbonaceous substrates deficient in nutrients.

20. The method of claim 1, further comprising adding conditioning substrates that include at least one of nitrogen, phosphorus, potassium or sulfur.

21. The method of claim 1, anaerobically digesting includes the use of a plug flow, completely mixed, thermophilic, mesophilic, psychrophilic, temperature phased, acid phased, pre-acidified, continuous flow, batch flow, sequencing batch, decant anaerobic contact, or anaerobic contact stabilization digester.

22. The method of claim 1, wherein the step of anaerobically digesting converts from about 40% to 80% of the biodegradable solids that are in the diluted influent slurry.

23. The method of claim 1, further comprising heating while anaerobically digesting the diluted influent slurry.

24. The method of claim 1, further comprising heating the influent slurry and the diluted influent slurry.

25. The method of claim 1, further comprising removing gases produced during anaerobically digesting the diluted influent slurry, wherein the gases include carbon dioxide and/or hydrogen sulfide.

26. The method of claim 1, further comprising adding a reagent to separate water from the digester effluent.

27. The method of claim 26, wherein the reagent includes one of a polymer, flocculant, or coagulant.

28. The method of claim 27, wherein the reagent is ferric chloride, ferric sulfate, or ammonium sulfate.

29. The method of claim 1, wherein the step of separating water comprises the use of equipment selected from a flotation separator, a belt separator, a centrifuge, screw press, a filter press, or any combination of two or more of the equipment.

30. The method of claim 1, further comprising concentrating the dewatered solids effluent by air-drying or composting.

31. The method of claim 1, further comprising concentrating the dewatered solids effluent and returning the liquid recovered from concentrating to the recycle water.

32. The method of claim 1, wherein toxic compounds include ammonia, hydrogen sulfide, or organic acids.

33. The method of claim 1, wherein the step of removing toxic compounds comprises the use of a physical, chemical, or biological process.

34. The method of claim 1, further comprising converting toxic compounds into nitrates, sulfates, carbonates, elemental sulfur, iron sulfur compounds, ammonia compounds, organic compounds containing nitrogen and sulfur, or a salt.

35. The method of claim 1, further comprising combining the separated toxic compounds or converted compounds therefrom with the digester effluent.

36. The method of claim 1, further comprising adjusting the rate of water to the step of anaerobically digesting or the rate of water from the step of anaerobically digesting.

37. The method of claim 1, wherein the recycle water is stored in a vessel.

38. The method of claim 37, wherein the stored water is heated.

39. The method of claim 37, wherein the stored water is used to control the concentration of solids in the dewatered solids effluent.

40. The method of claim 1, wherein the step of separating water comprises the use of at least one separator selected from a filter, flotation separator, a gravity belt, a centrifuge, screw press, or a belt filter press.

41. An anaerobic digestion process, comprising:
(a) anaerobically digesting a diluted influent slurry and producing a digester effluent and gas;
(b) separating water from the digester effluent to produce a dewatered solids effluent and a liquid effluent;
(c) removing toxic compounds from the liquid effluent and/or the gas to produce separated compounds and detoxified liquid effluent from the liquid effluent and/or to produce separated compounds from the gas;
(d) mixing the detoxified liquid effluent with influent slurry to produce the diluted influent slurry; and
(e) combining the separated compounds from the liquid effluent and/or the gas with the dewatered solids effluent.

42. The process of claim 41, wherein step (e) produces a balanced fertilizer.

43. The process of claim 41, wherein the toxic compounds removed from the liquid effluent at least one of ammonia, hydrogen sulfide, or a volatile organic acid.

44. The process of claim 41, wherein the separated compounds from the liquid effluent that are combined with the dewatered solids effluent include at least one of ammonia, hydrogen sulfide, an organic acid, or a chemically, biologically, or physically converted compound therefor.

45. The process of claim 41, wherein the toxic compounds removed from the gas include at least one of carbon dioxide or hydrogen sulfide.

46. The process of claim 41, wherein the product of combining separated compounds with the dewatered solids effluent is a balanced fertilizer.

47. The process of claim 41, wherein the separated compounds from the gas that are combined with the dewatered solids effluent include at least one of hydrogen sulfide, carbon dioxide or a chemically, biologically, or physically converted compound therefrom.

* * * * *